US011882423B2

(12) United States Patent
Zhou

(10) Patent No.: US 11,882,423 B2
(45) Date of Patent: Jan. 23, 2024

(54) MULTI-INPUT-DRIVING LOUDSPEAKER

(71) Applicant: SUZHOU RUSHENG ELECTRONICS CO., LTD., Jiangsu (CN)

(72) Inventor: Jianming Zhou, Suzhou (CN)

(73) Assignee: SUZHOU RUSHENG ELECTRONICS CO., LTD., Jiangsu (CN)

(*) Notice: Subject to any disclaimer, the term of this patent is extended or adjusted under 35 U.S.C. 154(b) by 229 days.

(21) Appl. No.: 17/623,320

(22) PCT Filed: Oct. 23, 2019

(86) PCT No.: PCT/CN2019/112660
§ 371 (c)(1),
(2) Date: Dec. 28, 2021

(87) PCT Pub. No.: WO2021/007983
PCT Pub. Date: Jan. 21, 2021

(65) Prior Publication Data

US 2022/0369039 A1 Nov. 17, 2022

(30) Foreign Application Priority Data

Jul. 15, 2019 (CN) ......................... 201910635285.9

(51) Int. Cl.
*H04R 9/04* (2006.01)
*H04R 7/12* (2006.01)
(Continued)

(52) U.S. Cl.
CPC ............... *H04R 9/046* (2013.01); *H04R 7/12* (2013.01); *H04R 7/20* (2013.01); *H04R 9/027* (2013.01);
(Continued)

(58) Field of Classification Search
CPC ............. H04R 9/046; H04R 7/12; H04R 7/20
(Continued)

(56) References Cited

U.S. PATENT DOCUMENTS 8,009,857 B2 * 8/2011 Bohlender ............... H04R 9/06 381/400
2009/0141916 A1 * 6/2009 Clair ........................ H04R 7/04 381/182

FOREIGN PATENT DOCUMENTS

CN 107454530 A * 12/2017 ............... H04R 9/02
CN 207427463 U 5/2018
(Continued)

OTHER PUBLICATIONS

International Search Report for PCT/CN2019/112660 dated Apr. 7, 2020.

*Primary Examiner* — Sunita Joshi
(74) *Attorney, Agent, or Firm* — Schmeiser, Olsen & Watts, LLP

(57) ABSTRACT

A multi-input-driving loudspeaker, including: a frame; a cone arranged on the frame; a main input-driving mechanism; and a plurality of secondary input-driving mechanisms; wherein the main input-driving mechanism is arranged between the plurality of secondary input-driving mechanisms; the main input-driving mechanism includes a main voice coil, a T-yoke, and a front panel and a first magnetic steel sleeved on the T-yoke, a main voice coil mounting hole is provided in the middle of the cone, an upper end portion of the main voice coil is connected to the main voice coil mounting hole; each of the secondary input-driving mechanisms includes a secondary voice coil and a secondary magnetic circuit assembly formed with a secondary magnetic gap, a plurality of secondary voice coil mounting holes are correspondingly provided on the cone,
(Continued)

an upper end portion of each secondary voice coil is connected to a corresponding secondary voice coil mounting hole.

15 Claims, 4 Drawing Sheets

(51) Int. Cl.
*H04R 7/20* (2006.01)
*H04R 9/02* (2006.01)
*H04R 9/06* (2006.01)

(52) U.S. Cl.
CPC ......... *H04R 9/06* (2013.01); *H04R 2209/041* (2013.01)

(58) Field of Classification Search
USPC .......................................................... 381/401
See application file for complete search history.

(56) References Cited

FOREIGN PATENT DOCUMENTS

| | | | |
|---|---|---|---|
| CN | 110225440 | A | 9/2019 |
| EP | 0169792 | A1 | 1/1986 |

* cited by examiner

MULTI-INPUT-DRIVING LOUDSPEAKER

CROSS-REFERENCE TO RELATED APPLICATIONS

This application claims priority to PCT Application No. PCT/CN2019/112660, having a filing date of Oct. 23, 2019, which is based on CN 201910635285.9, having a filing date of Jul. 15, 2019, the entire contents both of which are hereby incorporated by reference.

FIELD OF TECHNOLOGY

The following relates to the loudspeaker field, in particular to a multi-input-driving loudspeaker.

BACKGROUND

Existing loudspeakers generally adopt a structure comprising a conical cone (made of paper, PP and other materials) combined with a damper, the middle of the conical cone and the damper is respectively provided with a central hole, the damper is arranged below the conical cone, a single signal input voice coil passes through the central holes of the damper and the conical cone, and the conical cone and the damper are glued on the outer wall of the voice coil respectively to form a loudspeaker vibration system. This kind of loudspeaker can only be used for single signal input and has limitations on the reproduction of the original sound.

Therefore, one of the current improvements is to adopt a structure comprising a conical cone combined with a damper, central holes are opened in the middle of the cone and the damper, respectively, the damper is arranged below the conical cone, and the voice coil is changed from the single signal input mode to a multiple signal input mode and passes through the central holes of the damper and the conical cone, wherein the voice coil is formed by stacking multiple sets of coils from the inside to the outside, and the conical cone and the damper are glued on the outer wall of the voice coil respectively to form a loudspeaker vibration system. This kind of loudspeaker can be used for multiple signal input. However, since this type of loudspeaker has multiple sets of coils wound on one voice coil, winding multiple sets of coils into one voice coil increases the weight of the voice coil, and when the voice coil drives the cone, the sensitivity of the loudspeaker will be lost.

SUMMARY

An aspect relates to a multi-input-driving loudspeaker, which reduces the distortion of a loudspeaker, increases the sensitivity of a loudspeaker, improves the intelligibility of a loudspeaker, meanwhile has a compact structure.

To achieve the above purpose, the technical solution employed by the present disclosure is:

a multi-input-driving loudspeaker comprising a frame, and a cone arranged on the frame, and the loudspeaker further comprising a main input-driving mechanism and a plurality of secondary input-driving mechanisms, and the main input-driving mechanism is arranged between the plurality of secondary input-driving mechanisms;

wherein the main input-driving mechanism comprises a main voice coil, a T-yoke, and a front panel and a first magnetic steel sleeved on the T-yoke, a main voice coil mounting hole is provided in the middle of the cone, an upper end portion of the main voice coil is connected to the main voice coil mounting hole, a main magnetic gap for the main voice coil to be inserted is formed between the T-yoke and the front panel and the first magnetic steel, and a central hole is provided in the middle of the frame that allows a lower portion of the main voice coil to be inserted into the main magnetic gap;

each of the secondary input-driving mechanisms comprises a secondary voice coil and a secondary magnetic circuit assembly with a secondary magnetic gap, a plurality of secondary voice coil mounting holes are correspondingly provided on the cone, the main voice coil mounting hole is located between the plurality of secondary voice coil mounting holes, an upper end portion of each secondary voice coil is connected to a corresponding secondary voice coil mounting hole, a plurality of secondary magnetic circuit mounting holes are correspondingly provided on the frame, the central hole is located between the plurality of secondary magnetic circuit mounting holes, and a lower portion of each secondary voice coil is inserted into a corresponding secondary magnetic gap through a corresponding secondary magnetic circuit mounting hole.

In the present disclosure, "multi-input" refers to multiple audio signal inputs; "multi-input driving" refers to multiple audio signals input to multiple voice coils, and the multiple voice coils jointly drive the loudspeaker to produce sound.

In an embodiment, each of the secondary input-driving mechanism further comprises an elastic dust ring, and the dust ring is sleeved on the voice coil.

In an embodiment, an upper end of the dust ring is connected to the cone, and a lower end of the dust ring is connected to the frame.

In one embodiment, the dust ring is a corrugated hose.

In an embodiment, the plurality of secondary input-driving mechanisms surrounds the main input-driving mechanism or is located on both sides of the main input-driving mechanism.

In an embodiment, the cone has a flat-sheet cone bottom, the main voice coil mounting hole and the secondary voice coil mounting holes are opened on the cone bottom.

In an embodiment, there are three or more secondary input driving mechanisms, and the three or more secondary input-driving mechanisms are arranged at equal intervals around the main input-driving mechanism along a circle, the three or more secondary voice coil mounting holes are arranged at intervals along the circle around a center line of the main voice coil mounting hole, and the three or more secondary magnetic circuit mounting holes are arranged at equal intervals along the circle around a center line of the central hole.

In an embodiment, the cone has a flat-sheet cone bottom that is round as a whole, a center of the circle coincides with a center of the cone bottom, and the main voice coil mounting hole and the cone bottom are arranged concentrically.

In an embodiment, the cone further comprises a tapered edge portion extending obliquely upwards from an outer edge of the cone bottom, and the tapered edge portion is fixedly connected to the frame through a yoke ring.

In an embodiment, the main input-driving mechanism further comprises a damper, and the main voice coil passes through the damper and capable of moving in an up-and-down direction.

In an embodiment, the frame is provided with a flange surrounding the central hole, and the damper and the flange cooperate with each other so that the damper is clamped into the flange.

In an embodiment, the front panel is fixedly connected to a lower portion of the frame.

In an embodiment, the secondary magnetic circuit assembly comprises a U-yoke having an inner cavity, a second magnetic steel and a magnetic pole core arranged within the U-yoke, a secondary magnetic gap is formed between the second magnetic steel and the magnetic pole core and an inner wall of the U-yoke, the secondary voice coil is inserted in the secondary magnetic gap and capable of moving in an up-and-down direction, and an upper edge of the U-yoke is fixedly connected to the secondary magnetic circuit mounting hole of the frame.

In an embodiment, each of the main input-driving mechanism and the secondary input-driving mechanisms comprises a dust cover, and each of main voice coil mounting hole and the secondary voice coil mounting holes is covered with one dust cover.

Due to the use of the above technical solutions, the present disclosure has the following advantages over the conventional art:

the multi-input-driving loudspeaker of the present disclosure drives the cone vibration to occur through the combination of one main input-driving mechanism and four secondary input-driving mechanisms, which increases the driving energy of the loudspeaker; a plurality of secondary input-driving mechanisms surrounding around the main input-driving mechanism makes the overall structure more compact on the premise of increasing the driving energy of the loudspeaker and avoids excessive volume. The structure is ingenious and rational, and by using a plurality of voice coils to drive the cone, and having audio signal inputs, the product distortion is reduced, the sensitivity of a loudspeaker is increased, and the intelligibility of a loudspeaker is improved.

BRIEF DESCRIPTION

Some of the embodiments will be described in detail, with references to the following Figures, wherein like designations denote like members, wherein.

LIST OF REFERENCE SIGNS

1—frame; 11—central hole; 12—secondary magnetic circuit mounting hole; 13—flange; 2—cone; 21—cone bottom; 211—main voice coil mounting hole; 212—secondary voice coil mounting hole; 22—yoke ring; 3—main input-driving mechanism; 31—dust cover; 32—main voice coil; 320—lead; 33—front panel; 34—first magnetic steel; 35—T-yoke; 36—damper; 4—secondary input-driving mechanism; 41—dust cover; 42—secondary voice coil; 420—lead; 43—secondary neodymium magnetic steel; 44—magnetic pole core; 45—main neodymium magnetic steel; 46—U-yoke; 47—dust ring; 470—lead hole; 5—audio signal input terminal.

DETAILED DESCRIPTION

In the following, the preferable embodiments of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure.

This embodiment provides a multi-input-driving loudspeaker, herein, “multi-input” refers to multiple audio signal inputs, multiple audio signals are input to multiple voice coils, and the multiple voice coils jointly drive the loudspeaker to produce sound.

Referring to FIG. 1 to FIG. 4, the loudspeaker comprises a frame 1, a cone 2 arranged on the frame 1, and the loudspeaker further comprises a main input driving mechanism 3 and a plurality of secondary input driving mechanisms 4. Wherein, the main input-driving mechanism 3 is arranged between the plurality of secondary input-driving mechanisms 4. Specifically, the plurality of secondary input-driving mechanisms 4 surround the main input-driving mechanism 3 or are located on both sides of the main input-driving mechanism 3, and the number of the secondary input-driving mechanisms 4 is three or more. In this embodiment, there are four secondary input driving mechanisms 4, and the four secondary input-driving mechanisms 4 are arranged at equal intervals around the main input-driving mechanism 3 along a circle.

Figure 1:
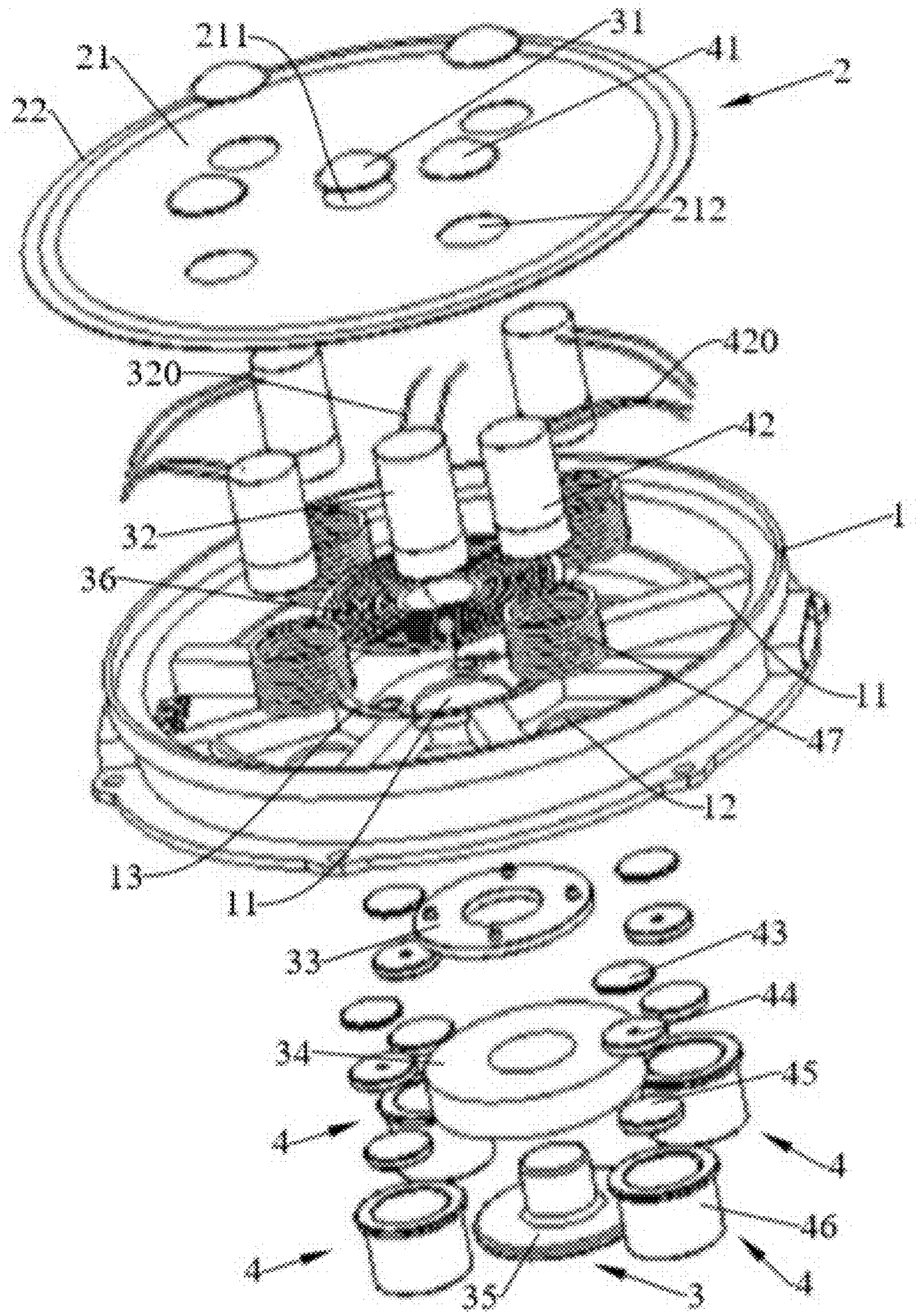
FIG. 1 is a schematic structure diagram of a loudspeaker according to an embodiment of the present disclosure.
Figure 2:
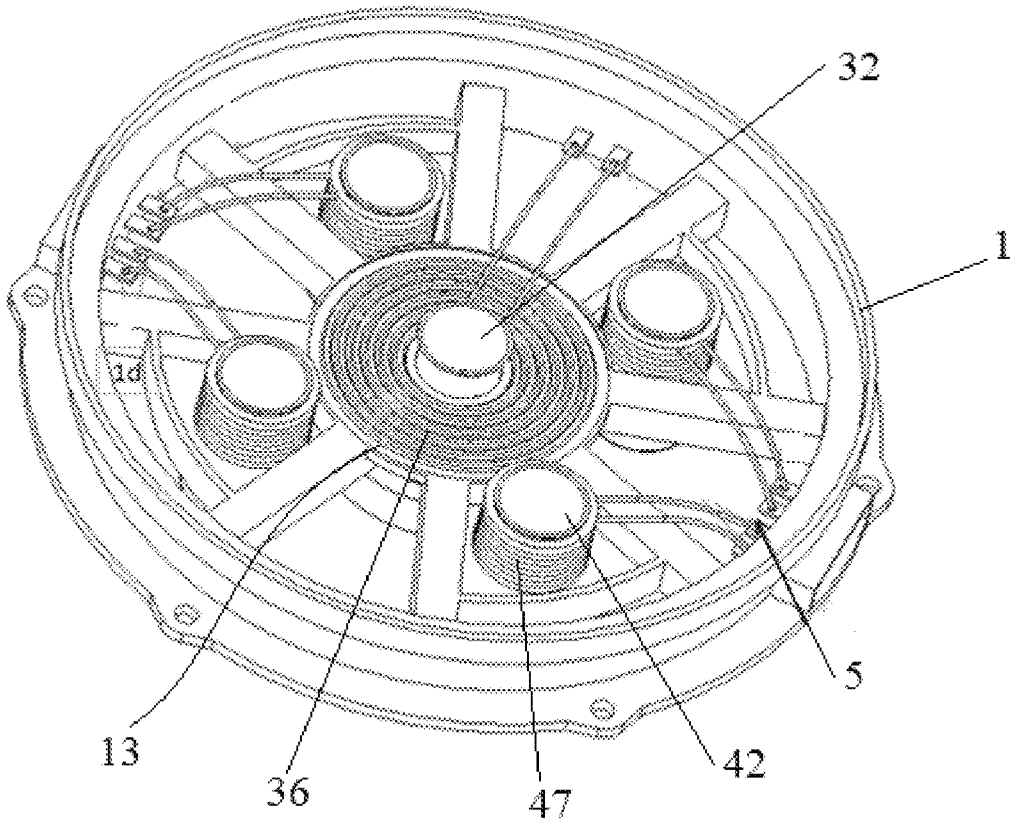
FIG. 2 is a schematic diagram of the loudspeaker in FIG. 1 after partially assembled.
Figure 3:
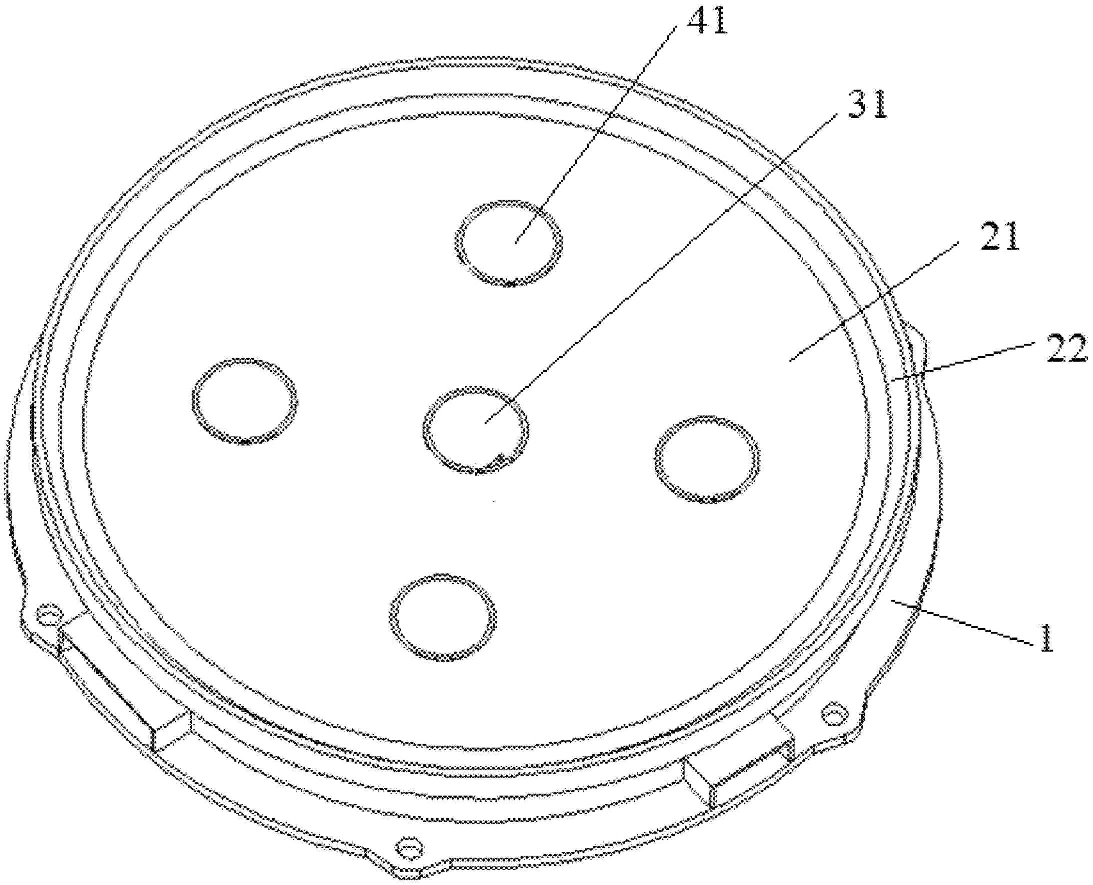
FIG. 3 is a schematic diagram of the loudspeaker in FIG. 1 after assembled.

Specifically, as shown in FIG. 1, the main input-driving mechanism 3 is in the middle of the loudspeaker, and comprises a main voice coil 32, a T-yoke 35, and a front panel 33 and a first magnetic steel 34 sleeved on the T-yoke 35. A main voice coil mounting hole 211 is provided in the middle of the cone 2, and an upper end portion of the main voice coil 32 is connected to the main voice coil mounting hole 211, that is, the main voice coil 32 is connected to the middle of the cone 2, to drive the cone 2. The front panel 33 is fixedly connected to the frame 1, specifically, the front panel 22 is provided with a plurality of lugs raised upwards, the lugs are inserted into corresponding holes in the bottom of the frame 1 to tightly connect the front panel 33 and the frame 1 by riveting. The middle portion of the T-yoke 35 has an upwards extending columnar portion, the front panel 33 and the first magnetic steel 34 are arranged from top to bottom and respectively opened with a through hole in the middle, so as to be sleeved on the columnar portion of the T-yoke 35, and there are gaps between the inner walls of the front panel 33 and the first magnetic steel 34 and the outer surface of the columnar portion of the T-yoke 35, thereby forming a main magnetic gap, and the corresponding upper and lower surfaces of the front panel 33, the first magnetic steel 34 and the T-yoke 35 are closely fitted and fixedly connected. A central hole 11 is provided in the middle of the frame 1, the lower portion of the main voice coil 32 passes through the central hole 11 and is inserted into the main magnetic gap, and can move up and down in the main magnetic gap. The first magnetic steel 34 is specifically ferrite magnetic steel.

The main input-driving mechanism 3 further comprises a damper 36, and the damper is specifically located in a cavity between the cone 2 and the frame 1. A through hole is opened in the middle of the damper 36, the main voice coil 32 is movably inserted in the damper 36 which is capable of moving in the up and down direction, and the outer surface of the main voice coil 32 and the damper 36 are closely fitted to prevent the damper 36 from shaking, therefore, the main voice coil 32 is restricted to only move in the up and down direction, and displacement in the horizontal direction is not allowed. Further, the frame 1 has a flange 13 surrounding the central hole 11, the flange 13 encircles the central hole 11 and its shaped is a closed circular ring, and the damper 36 and the flange 13 cooperate with each other so that the damper 36 is clamped into the flange 13 and retained by the inner walls of the flange 13.

Each secondary input-driving mechanisms 4 respectively comprises a secondary voice coil 42 and a secondary magnetic circuit assembly formed with a secondary magnetic gap. The cone 2 is provided with a plurality of secondary voice coil mounting holes 212 correspondingly, and the main voice coil mounting hole 211 is located between the plurality of secondary voice coil mounting holes 212. Specifically, the four secondary voice coil mounting holes 212 are arranged at equal intervals along the circle around the center line of the main voice coil mounting hole 211. An upper end portion of each secondary voice coil 42 is connected to a corresponding secondary voice coil mounting hole 212, that is, the upper end portions of the four secondary voice coils 42 are connected to the cone 2, to drive the cone 2. Four secondary magnetic circuit mounting holes 12 are correspondingly opened in the frame 1, the central hole 11 is located between the four secondary magnetic circuit mounting holes 12, and the four secondary magnetic circuit mounting holes 12 are arranged at equal intervals along the circle around the center line of the central hole 11. A lower portion of each secondary voice coil 42 is inserted into a corresponding secondary magnetic gap through a corresponding secondary magnetic circuit mounting holes 12, and is movable in the secondary magnetic gap in an up-and-down direction. The secondary magnetic circuit assembly comprises a U-yoke 46 with an inner cavity, and a second magnetic steel and a magnetic pole core 44 arranged within the U-yoke 46. The second magnetic steel specifically comprises a secondary neodymium magnetic steel 43 and a main neodymium magnetic steel 45, the secondary neodymium magnetic steel 43, the magnetic pole core 44 and the main neodymium magnetic steel 45 are closely stacked from top to bottom, and there are gaps between the outer surfaces of the three and the inner surface of the U-yoke 46, which form the secondary magnetic gap. The middle portion of the U-yoke 46 is recessed and the outer peripheral edge thereof extends upwards, and the upper edge of the U-yoke 46 is fixedly connected to the secondary magnetic circuit mounting hole 12 of the frame 1. The secondary magnetic circuit assembly in this embodiment adopts the above secondary neodymium magnetic steel 43 and the main neodymium magnetic steel 45, which has the advantages of small size and light weight. The secondary input-driving mechanisms 4 are input driving mechanisms without the damper 36, so it is small in size and light in weight.

In this embodiment, the cone is driven to vibrate through the combination of one main input-driving mechanism 3 and four secondary input-driving mechanisms 4, which increases the driving energy of the loudspeaker; on the premise of increasing the driving energy of the loudspeaker, it makes the overall structure more compact and avoids excessive volume. Moreover, the front panel 33 of the main input-drive mechanism 3 is fixedly assembled on the frame 1, and the U-yokes 46 of the secondary input drive mechanisms 4 are fixedly assembled on the frame 1, which improves the accuracy of assembling.

Figure 4:
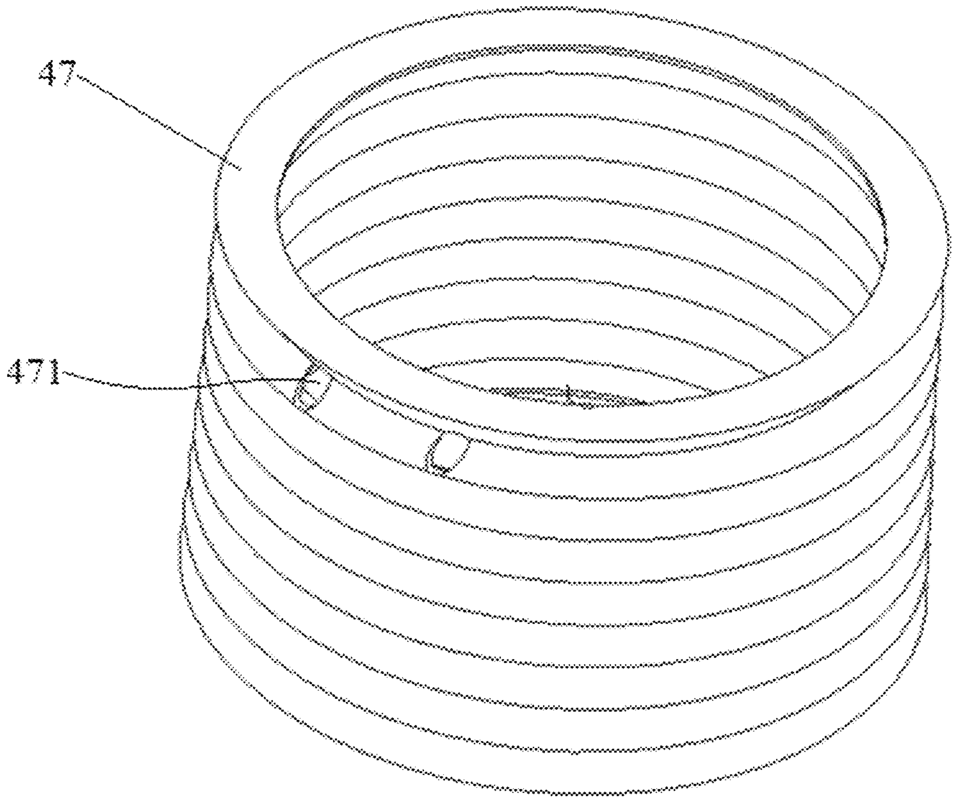
FIG. 4 is a schematic diagram of the dust ring in FIG. 1.

Referring to FIG. 4, each secondary input-drive mechanism 4 further comprises an elastic dust ring 47, the dust ring 47 is sleeved on the corresponding voice coil, an upper end of the dust ring 47 is tightly coupled with the cone 2, and the lower end of the dust ring 47 is tightly coupled with the frame 1. The material of the dust ring 47 is cloth, plastic, or rubber. In this embodiment, the dust ring 47 is a corrugated hose. A pair of lead holes 470 for the leads of the secondary voice coil 42 to pass though are opened on the dust ring 47. The dust ring 47 makes the secondary magnetic circuit assembly substantially in a sealed environment, and effectively prevents dust and the like from entering the secondary magnetic circuit assembly.

In this embodiment, the cone 2 has a flat cone bottom 21 that is round as a whole, the centers of the above-mentioned circle coincide or are collinear with the center of the cone bottom 21, and the main voice coil mounting hole 211 and the cone bottom 21 are arranged concentrically. The cone bottom 21 is fixedly connected to the frame 1 through a yoke ring 22. In some other embodiments, the cone 2 further has a tapered edge portion extending upwards from the outer edge of the cone bottom 21, and the tapered edge portion is fixedly connected to the frame 1 by the yoke ring 22; further, the cone 2 is provided with a plurality of reinforcing ribs, which extend from the bottom 21 to the tapered edge portion of the cone, thereby enhancing the strength between the bottom 21 and the tapered edge portion of the flat cone. The cone 2 with the above-mentioned shape is superior to the traditional conical loudspeaker in terms of directional expansion width, and the height is lower than that of the traditional conical cone 2, which is beneficial to reducing the overall height of the loudspeaker. In this embodiment, the frame 1 is made of plastic using processes such as injection molding, which is easy to form and has a certain strength. The cone bottom 21 is made of paper pulp, plastic (such as, PP (polypropylene)), ballistic fiber or aluminum alloy, and the made cone 2 is light in weight, has good damping elasticity and rigidity, high temperature and low temperature resistance, waterproof and mildew proof, and the yoke ring is made of sponge, rubber, or cloth materials.

In this embodiment, the plurality of secondary input-driving mechanisms 4 is arranged along the circle, and the entire voice coil is circular. In some other embodiments, the voice coils and the magnetic circuit drive assembles are arranged linearly or rectangularly, and the main input-driving mechanism 3 is in the middle position, and the plurality of secondary input-driving mechanisms 4 are arranged around the main input-driving mechanism 3, or are arranged on both sides of the main input-driving mechanism 3, the shape of the cone is ellipse or rectangle.

The main input-driving mechanism 3 comprises a dust cover 31, and the main voice coil mounting hole 211 is covered with the dust cover 31. Each secondary input-driving mechanism 4 further comprises a dust cover 41, and each secondary voice coil mounting hole 212 is covered with one dust cover 41. The dust covers 31 and 41 are fixedly connected to the cone 2.

The edge portion of the frame 1 is provided with five pairs of audio signal input terminals 5, the five pairs of audio signal input terminals 5 are arranged at intervals along the circle of the frame 1, and the frame 1 is provided with slots for connecting external cables. The pair of leads of the main voice coil 32 are electrically connected to one pair, and the pair of leads of each secondary voice coil 42 are electrically connected to the corresponding pair of audio signal input terminals 5. Wherein, each pair of audio signal input terminals 5 comprises a positive terminal and a negative terminal, one of a pair of leads is electrically connected to the positive terminal, and the other lead is electrically connected to the negative terminal, to receive the audio signal (analog signal or digital signal) input from the pair of audio signal input terminal 5. Thus, one main voice coil 32 and four secondary voice coils 42 are simultaneously driven through the five pairs of audio signal input terminals 5. Providing multiple integrated terminals for audio signal input in the frame 1 simplifies the manufacture of multi-input-driving loudspeakers, and is also convenient for the connection of audio signal input.

The loudspeaker provided by this embodiment has an ingenious and rational structure by surrounding a plurality of secondary input-driving mechanisms 4 around the main input-driving mechanism 3, and can reduce the size of the magnetic circuit structure by adopting a combined structure of one main input-driving mechanism 3 with a damper 36 and a plurality of secondary input-driving mechanisms 4 without the damper 36; multi-audio signal input driving is achieved through a main input-driving mechanism 3 and a plurality of secondary input drive mechanisms 4; by adopting a cone 2 being flat in the middle, the directivity width will be better than traditional loudspeakers; through one main input-driving mechanism 3 and a plurality of secondary input-driving mechanisms 4 to respectively receive audio signal inputs, the original sound reproduction and distortion are superior to traditional loudspeakers; through the use of the cone 2 with a flat bottom, the height of the cone 2 is lower than the height of the traditional conical cone 2, and the reduction in the height of the cone 2 in turn reduces the height of the product; by adopting a driving structure composed of a main input-driving mechanism 3 and a plurality of secondary input-driving mechanisms 4, the loudspeaker sensitivity is increased.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

I claim:

1. A multi-input-driving loudspeaker, comprising, a frame;

a cone arranged on the frame;

a main input-driving mechanism comprising a main voice coil, a T-yoke, and a front panel and a first magnetic steel sleeved on the T-yoke, a main voice coil mounting hole is provided in the middle of the cone, an upper end portion of the main voice coil is connected to the main voice coil mounting hole, a main magnetic gap for the main voice coil to be inserted is formed between the T-yoke and the front panel and the first magnetic steel, and a central hole is provided in the middle of the frame that allows a lower portion of the main voice coil to be inserted into the main magnetic gap, and a plurality of secondary input-driving mechanisms, wherein the main input-driving mechanism is arranged between the plurality of secondary input-driving mechanisms, each of the secondary input-driving mechanisms comprises a secondary voice coil and a secondary magnetic circuit assembly formed with a secondary magnetic gap, a plurality of secondary voice coil mounting holes are correspondingly provided on the cone, the main voice coil mounting hole is located between the plurality of secondary voice coil mounting holes, an upper end portion of each secondary voice coil is connected to a corresponding secondary voice coil mounting hole, a plurality of secondary magnetic circuit mounting holes are correspondingly provided on the frame, the central hole is located between the plurality of secondary magnetic circuit mounting holes, and a lower portion of each secondary voice coil is inserted into a corresponding secondary magnetic gap through a corresponding secondary magnetic circuit mounting hole.

2. The multi-input-driving loudspeaker according to claim 1, wherein each of the secondary input-driving mechanism further comprises an elastic dust ring, and the dust ring is sleeved on the secondary voice coil.

3. The multi-input-driving loudspeaker according to claim 2, wherein an upper end of the dust ring is connected with the cone, a lower end of the dust ring is connected with the frame, and a pair of lead holes for leads of the secondary voice coil to pass though are opened on the dust ring.

4. The multi-input-driving loudspeaker according to claim 2, wherein the dust ring is a corrugated hose.

5. The multi-input-driving loudspeaker according to claim 1, wherein the plurality of secondary input-driving mechanisms surround the main input-driving mechanism or are located on both sides of the main input-driving mechanism.

6. The multi-input-driving loudspeaker according to claim 1, wherein the cone has a flat-sheet cone bottom, the main voice coil mounting hole and the secondary voice coil mounting holes are opened on the cone bottom.

7. The multi-input-driving loudspeaker according to claim 1, wherein there are three or more secondary input driving mechanisms, and the three or more secondary input-driving mechanisms are arranged at equal intervals around the main input-driving mechanism along a circle, the three or more secondary voice coil mounting holes are arranged at intervals along the circle around a center line of the main voice coil mounting hole, and the three or more secondary magnetic circuit mounting holes are arranged at equal intervals along the circle around a center line of the central hole.

8. The multi-input-driving loudspeaker according to claim 7, wherein the cone has a flat-sheet cone bottom that is round as a whole, a center of the circle coincides with a center of the cone bottom, and the main voice coil mounting hole and the cone bottom are arranged concentrically.

9. The multi-input-driving loudspeaker according to claim 6, wherein the cone further comprises a tapered edge portion extending obliquely upwards from an outer edge of the cone bottom, and the tapered edge portion is fixedly connected to the frame through a yoke ring.

10. The multi-input-driving loudspeaker according to claim 1, wherein the main input-driving mechanism further comprises a damper, and the main voice coil passes through the damper and is capable of moving in an up-and-down direction.

11. The multi-input-driving loudspeaker according to claim 10, wherein the frame is provided with a flange surrounding the central hole, and the damper and the flange cooperate with each other so that the damper is clamped into the flange.

12. The multi-input-driving loudspeaker according to claim 1, wherein the front panel is fixedly connected to a lower portion of the frame.

13. The multi-input-driving loudspeaker according to claim 1, wherein the secondary magnetic circuit assembly comprises a U-yoke having an inner cavity, a second magnetic steel and a magnetic pole core arranged within the U-yoke, a secondary magnetic gap is formed between the second magnetic steel and the magnetic pole core and the inner wall of the U-yoke, the secondary voice coil is inserted in the secondary magnetic gap and capable of moving in an up-and-down direction, and an upper edge of the U-yoke is fixedly connected to the secondary magnetic circuit mounting hole of the frame.

14. The multi-input-driving loudspeaker according to claim 1, wherein each of the main input-driving mechanism and the secondary input-driving mechanisms comprises a dust cover, and each of the main voice coil mounting hole and the secondary voice coil mounting holes is covered with one dust cover.

15. The multi-input-driving loudspeaker according to claim 6, wherein the cone bottom is a flat sheet with the main voice coil mounting hole and the secondary voice coil mounting holes.

* * * * *